United States Patent
Cragun et al.

(10) Patent No.: US 8,689,329 B2
(45) Date of Patent: *Apr. 1, 2014

(54) SCOPING SCRIPTS IN A PAGE (71) Applicant: International Business Machines Corporation, Armonk, NY (US)

(72) Inventors: Brian J. Cragun, Rochester, MN (US); Douglas R. Fish, Rochester, MN (US); John E. Petri, St. Charles, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/772,266

(22) Filed: Feb. 20, 2013

(65) Prior Publication Data

US 2013/0159838 A1    Jun. 20, 2013

Related U.S. Application Data

(63) Continuation of application No. 12/869,073, filed on Aug. 26, 2010, now abandoned.

(51) Int. Cl.
*G06F 11/00* (2006.01)
*G06F 17/30* (2006.01)
*G06F 15/16* (2006.01)
*G06F 12/02* (2006.01)

(52) U.S. Cl.
USPC ............... 726/23; 726/27; 709/218; 709/228; 345/565

(58) Field of Classification Search
USPC ........ 726/22–33; 709/203, 217–219; 713/150
See application file for complete search history.

(56) References Cited

U.S. PATENT DOCUMENTS

2011/0083196 A1*    4/2011    Graham et al. ................. 726/27

OTHER PUBLICATIONS

Deng et al. Hierarchical Clustering of WWW Image Search Results Using Visual, Textual and Link Information October, ACM; p. 1-8.*
Technical Disclosure, "Method and System for Partitioning Multi-Sourced (Aggregated) Document Object Models", IP.com, IPCOM000186594D, published Aug. 27, 2009.
Deng et al., Hierarchical Clustering of WWW Image Search Results Using Visual, Textual and Link Information, Oct. 2004.

* cited by examiner

*Primary Examiner* — Evans Desrosiers
(74) *Attorney, Agent, or Firm* — Martin & Associates, LLC (57) ABSTRACT

A mechanism on a server divides a page of content into sections defined by dividers, and renders the page stream with dividers to a browser. The browser reads the web page with dividers, and partitions the DOM for the page to create partitions in the DOM according to the sections in the page. Partitioning the DOM allows scripts in each partition to be scoped according to defined access rights for each partition. In this manner, a script in one DOM partition cannot access information in another DOM partition unless the access rights for the partition that contains the script allow it. By scoping scripts to appropriate DOM partitions, potential hacker attacks may be prevented.

11 Claims, 5 Drawing Sheets

| DOM Partition | Access Rights |
|---|---|
| P1 | Local |
| P2 | Local |
| P3 | Local |
| P4 | Page |

FIG. 8

SCOPING SCRIPTS IN A PAGE

BACKGROUND

1. Technical Field

This disclosure generally relates to a system for providing content to a user, and more specifically relates to a system for controlling execution of scripts that attempt to access different sections of a page.

2. Background Art

When the Internet was in its infancy, static information was presented to a web browser as a single stream of data called a "web page." Later, web pages were enhanced so they could include dynamic information, such as stock quotes. These web pages were still presented in the form of a single stream of data, with the dynamic data being inserted by the server at the time the web page was requested. Newer advancements in web pages include scripting languages such as JavaScript that allow content in a web page to be acted upon in a browser via scripts. In addition, the notion of content aggregation allows a user to define a page that includes content from many different sources. A particular source of content on a page is sometimes referred to as a "portlet". Thus, a user could create a page that includes many portlets that each retrieves data from different content providers, such as web sites. Even with dynamic information from many different web sites that includes scripts, the final web page rendered to the user is a single stream of data after the web page is assembled by the server.

The ability to manipulate content via a script in the browser provides a way for a hacker to attack a user. For example, let's assume a user defines a web page with two portlets, one for online banking and one for online games. Let's further assume the web site that hosts the online games contains malware that attempts to send a user's personal information to a hacker that wrote the malware. In this scenario, a script in the game portal could interrogate a Document Object Model (DOM) for the web page, and determine that personal and banking information is available on the portlet for online banking The user's personal and banking information could then be accessed and sent by the script to the hacker. Thus, the complexity of multiple portlets and scripts makes the user potentially vulnerable to hacker attacks.

BRIEF SUMMARY

When a web page is assembled by a server, dividers are inserted into the stream of data to divide the web page into different sections. Each section may have corresponding access rights that determine whether scripts in the section may access content outside the section. The access rights are embedded as metadata into the stream of data for the web page. When a user's browser receives the web page, the browser detects the dividers, and partitions the DOM for the web page according to the sections defined by the dividers. The metadata is read to determine access rights for each section, which defines access rights for each corresponding DOM partition. Script calls are then intercepted to see if the call exceeds the access rights for the partition that originated the call. If so, execution of the script is blocked. If the call is within the access rights for the partition that originated the call, the script is processed. This provides an easy and effective way to scope script calls in a web page to appropriate boundaries, thereby defeating a possible hacker attack.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The claims and disclosure herein provide a mechanism on a server that divides the page into sections defined by dividers, and renders the page stream with dividers to a browser. The browser reads the web page with dividers, and partitions the DOM for the page to create partitions in the DOM according to the dividers in the page. Partitioning the DOM allows scripts in each partition to be scoped according to defined access rights for each partition. In this manner, a script in one DOM partition cannot access information in another DOM partition unless the access rights for the partition that originated the script allows it. By scoping scripts to appropriate DOM partitions, potential hacker attacks may be prevented.

Figure 1:
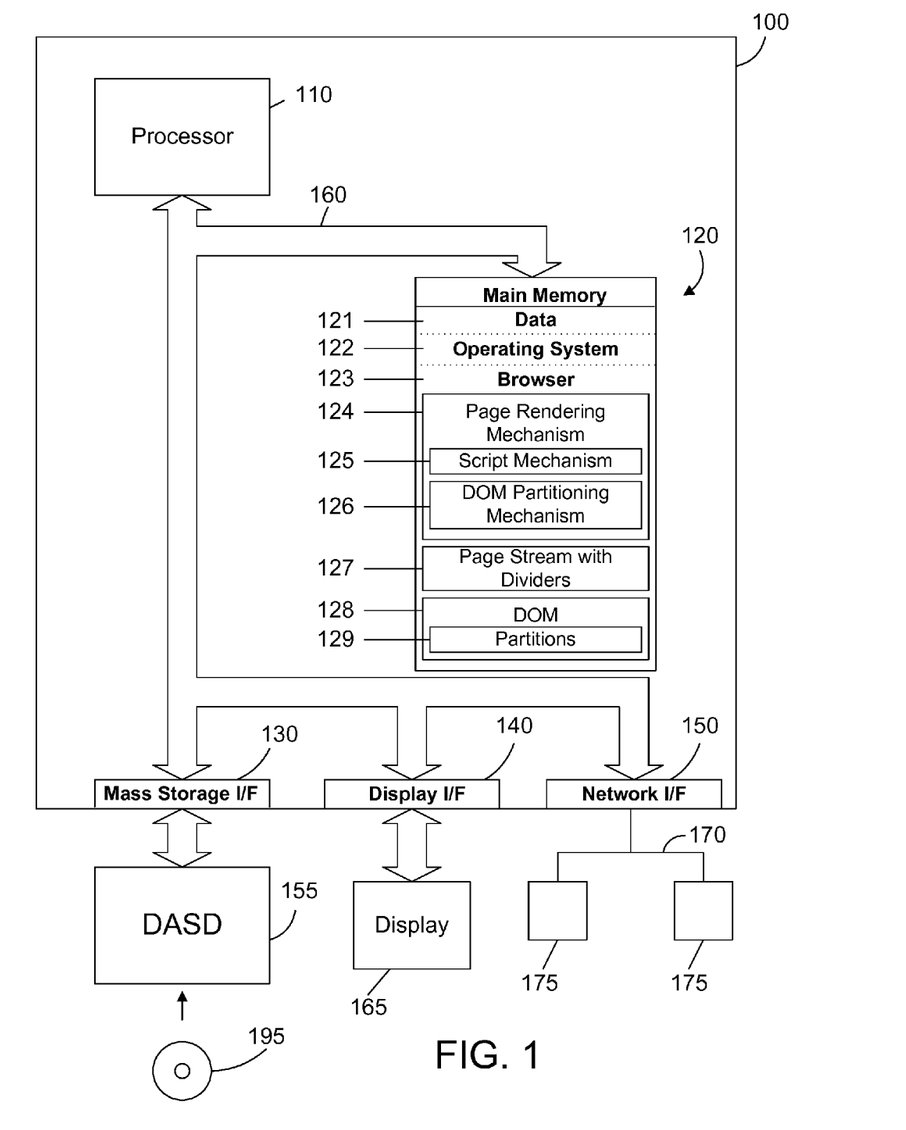
FIG. 1 is a block diagram of an apparatus that includes a page rendering mechanism that includes a partitioning mechanism.

Referring to FIG. 1, a computer system 100 is one suitable implementation of a computer system that includes a page rendering mechanism that includes a partitioning mechanism. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Figure 2:
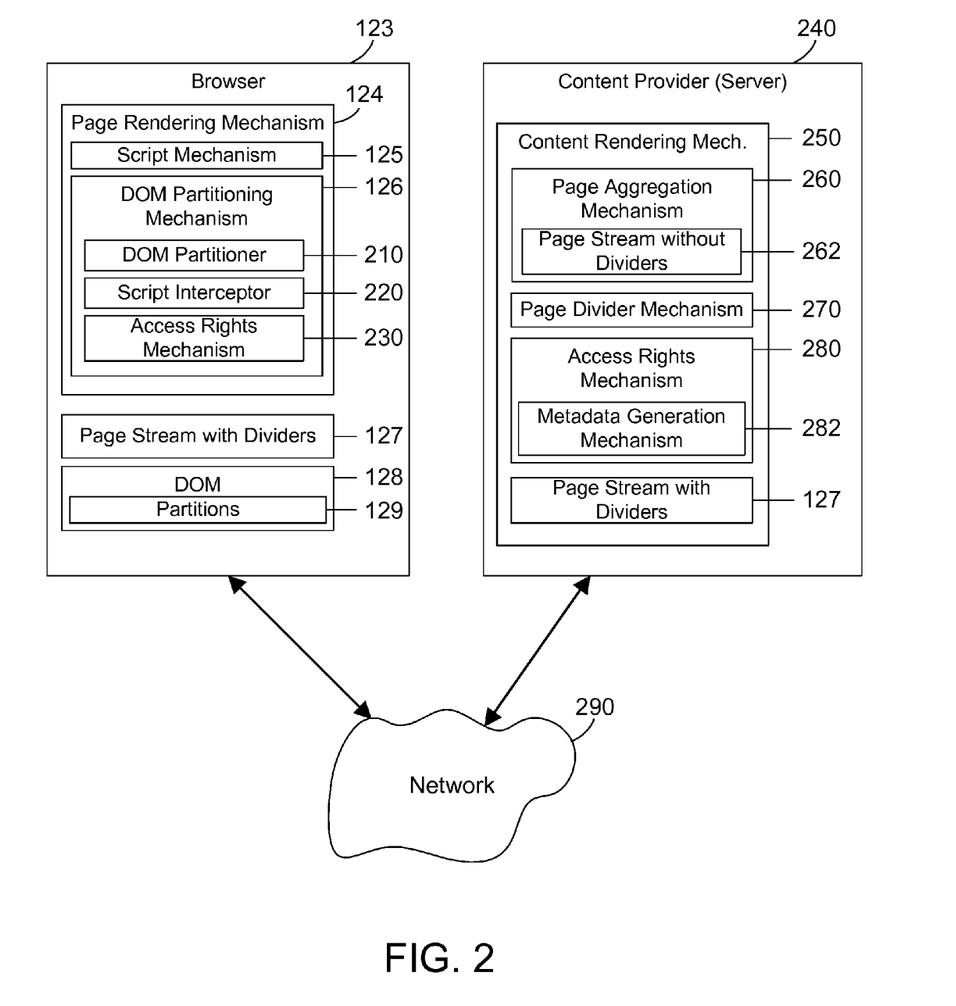
FIG. 2 is a block diagram that shows the browser of FIG. 1 coupled to a content provider via a network.

Main memory 120 preferably contains data 121, an operating system 122, and a browser 123. Data 121 represents any data that serves as input to or output from any program in computer system 100. Operating system 122 is a multitasking operating system. Browser 123 is a mechanism that may be used by a user to request content from a content provider. If the content is in the form of a web page, the browser 123 may be a known web browser, such as Microsoft Explorer, Mozilla Firefox, or Google Chrome. Note, however, the term "browser" used herein broadly encompasses any mechanism that allows a user to request content from a content provider, whether currently known or developed in the future. Thus, an operating system on a mobile phone is considered a "browser" if the user can request content using the mobile phone. The browser 123 includes a page rendering mechanism 124 that delivers a requested page to a user. The page rendering mechanism 124 receives a page stream with dividers 127, and renders the page to a user. The dividers may be any suitable mechanism for dividing the page stream into sections. In the most preferred implementation, the dividers are tags in markup language that identify the sections in the page stream. For example, the tag pair <Division_N> and <Division_N_END> could be used to define a section, where N represents any suitable character for numbering, naming or otherwise identifying the section. In the alternative, the end tag could be omitted, with sections defined between division tags, and the last division extending to the end of the page. These tags are given by way of example. The dividers herein could include any suitable manner for dividing a page into sections, whether currently known or developed in the future. The page rendering mechanism 124 also includes a script mechanism 125 and a DOM partitioning mechanism 126. More details of the DOM partitioning mechanism 126 are shown in FIG. 2 and described below. The script mechanism 125 is a tool such as JavaScript that allows scripts on a page to be executed. The DOM partitioning mechanism 126 partitions a Document Object Model (DOM) 128 that corresponds to the page stream with dividers 127 into multiple partitions 129 that correspond to the sections defined by the dividers in the page stream 127. Once the DOM is partitioned, the execution of scripts in the page may be controlled. The DOM 128 is a logical representation of elements in the page corresponding to the page stream 127. A DOM is well-known to one skilled in the art, and is therefore not defined or discussed in detail herein.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and browser 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that a DOM partitioning mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 2, a block diagram shows a system that allows delivery of content to a user using a browser as disclosed herein. Browser 123 represents a user interface that allows a user to request content from a content provider 240, such as a web server. Browser 123 and content provider 240 are coupled together via a network 290. Network 290 is one suitable representation for network 170 in FIG. 1, and may include a local area network, a wide area network, the Internet, etc. The content provider 240 includes a content rendering mechanism 250 that returns a page to the browser 123 in response to the browser requesting the page. The content rendering mechanism includes a page aggregation mechanism 260 that aggregates content from potentially many different content providers to generate a page stream without dividers 262. The page stream without dividers 262 is a typical web page that would be delivered to a requesting browser in the prior art. The content provider 240 further includes a page divider mechanism 270 that is used to insert dividers into the page stream without dividers 262 to generate the page stream with dividers 125. The dividers define a plurality of sections in the page. The access rights mechanism 280 includes a metadata generation mechanism 282 that generates suitable metadata that defines access rights for each section in the page stream with dividers 127, and inserts the metadata into the page stream with dividers 127. The result is the page stream 127 includes the dividers that define a plurality of sections in the page, and may optionally include metadata that defines access rights for one or more of the sections in the page.

As discussed above, the browser 123 may be any suitable interface for requesting content, whether using an existing web browser on a computer system, using a mobile phone, or using any other suitable device that is capable of downloading content from a content provider. The page rendering mechanism 124 in browser 123 includes a script mechanism 125, a DOM partitioning mechanism 126, a page stream with dividers 127, and a DOM 128, as discussed above with reference to FIG. 1. The DOM partitioning mechanism 126 includes a DOM partitioner 210, a script interceptor 220, and an access rights mechanism 230. The DOM partitioner 210 partitions the DOM 128 into a plurality of partitions 129 that correspond to the sections defined by the dividers in the page stream with dividers 127. The script interceptor 220 intercepts script calls from the page defined by the page stream with dividers 127, and determines whether to block or allow each script call based on access right for the DOM partition corresponding to the script call using the access rights mechanism 230. The access rights mechanism 230 determines access rights for a DOM partition, and returns the access rights to the script interceptor 220, which then determines based on those access rights whether to block or allow execution of the script corresponding to the script call.

Figure 3:
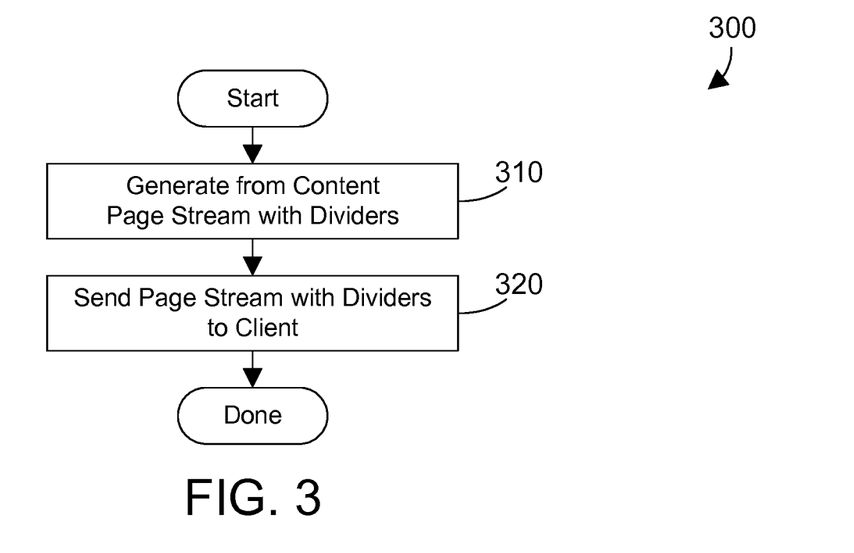
FIG. 3 is a flow diagram of a method for a server to deliver a page to a client.

Referring to FIG. 3, a method 300 is preferably performed by the content provider 240 in FIG. 2. A page stream with dividers (e.g., 127 in FIGS. 1 and 2) is generated from content (step 310). The page may include content from a number of different providers. The page stream with dividers is then sent to the client (step 320). Method 300 is then done.

Figure 4:
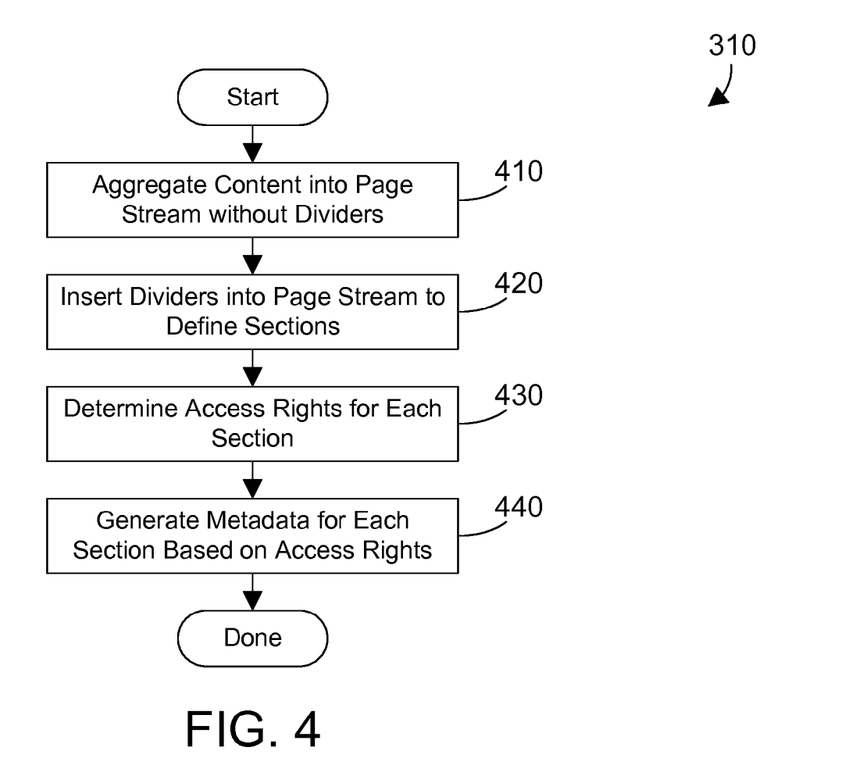
FIG. 4 is a flow diagram of a method that represents one specific implementation for step 310 in FIG. 3.

One suitable implementation for step 310 in FIG. 3 is shown as method 310 in FIG. 4. The content provider aggregates content into a page stream without dividers (step 410), then inserts dividers into the page stream to define multiple sections in the page (step 420). The content provider may also determine access rights for each section of the page (step 430), and generate metadata for each section based on the access rights (step 440). Note the metadata generated in step 440 is inserted into the page stream with dividers, so the metadata is included with the page sent to the browser. Method 310 is then done.

Figure 5:
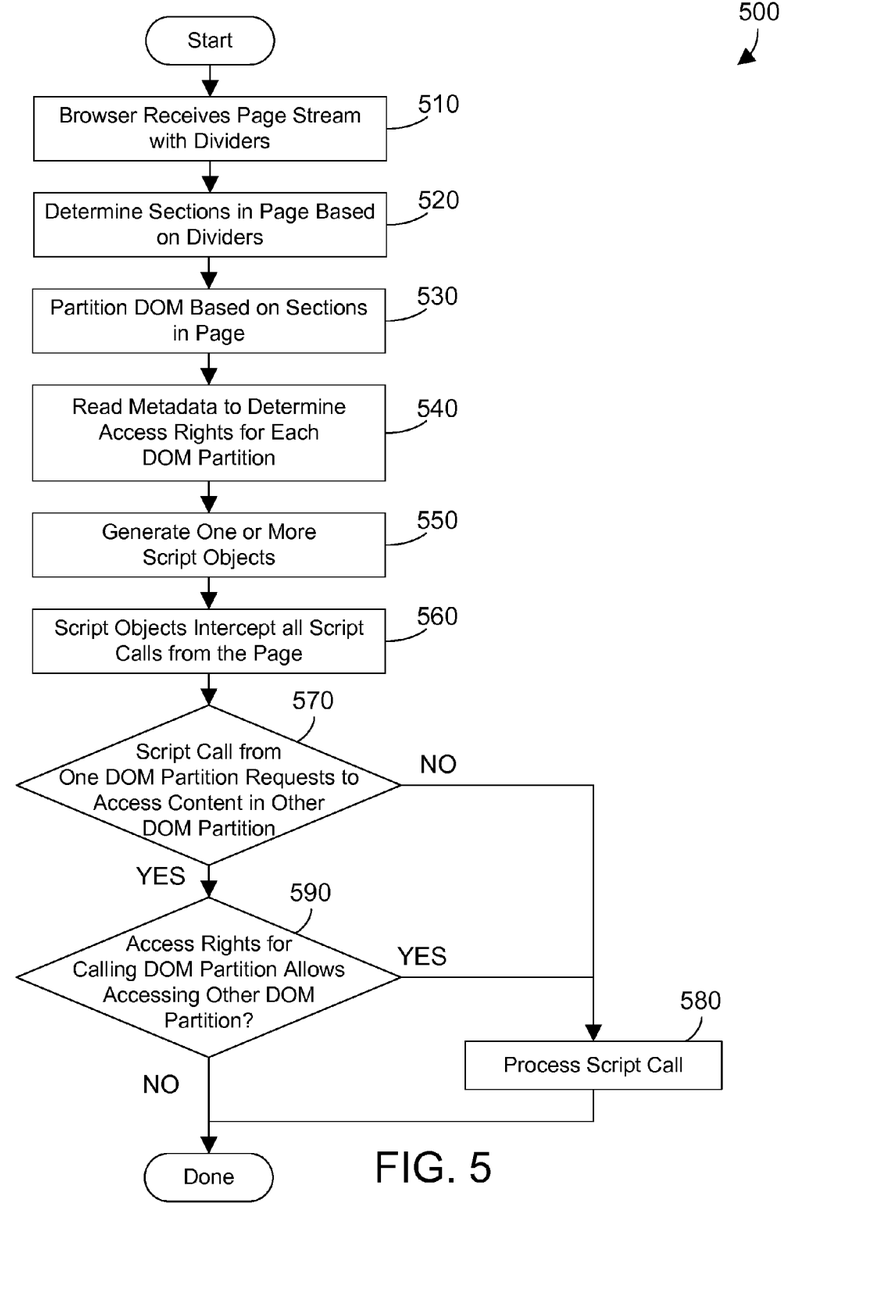
FIG. 5 is a flow diagram of a method for the browser in FIGS. 1 and 2 to process a page stream with dividers.

Referring to FIG. 5, a method 500 is preferably performed by browser 123 in FIGS. 1 and 2. The browser receives the page stream with dividers from the content provider (step 510). Next, sections in the page are determined based on the dividers (step 520). The DOM corresponding to the page is then partitioned based on the sections in the page (step 530). The metadata in the page is read to determine access rights for each DOM partition (step 540). Because the partitions in the DOM correspond to the sections in the page, access rights for each section of the page are also access rights for each corresponding partition in the DOM. One or more script objects are then generated (step 550). The script object(s) then intercept all script calls from the page (step 560). In one specific implementation, a script object is defined for the page, and the script object intercepts all script calls from the page. In another specific implementation, a script object is defined for each DOM partition, and each script object will intercept script calls from its partition, The disclosure and claims expressly extend to any suitable number of script objects. When a script call from one DOM partition requests to access content in a different DOM partition (step 570=YES), the access rights for the calling DOM partition are used to determine whether the calling DOM partition is allowed to access the other DOM partition. If not (step 590=NO), the script call is blocked, which means the script is not processed. When the script call from one DOM partition requests to access only content within that DOM partition (step 570=NO), the script call is processed (step 580). When the script call from one DOM partition requests to access content in a different DOM partition (step 570=YES), and when the access rights for the calling DOM partition allows accessing the different DOM partition (step 590=YES), the script call is processed (step 580). Method 500 is then done.

Figure 6:
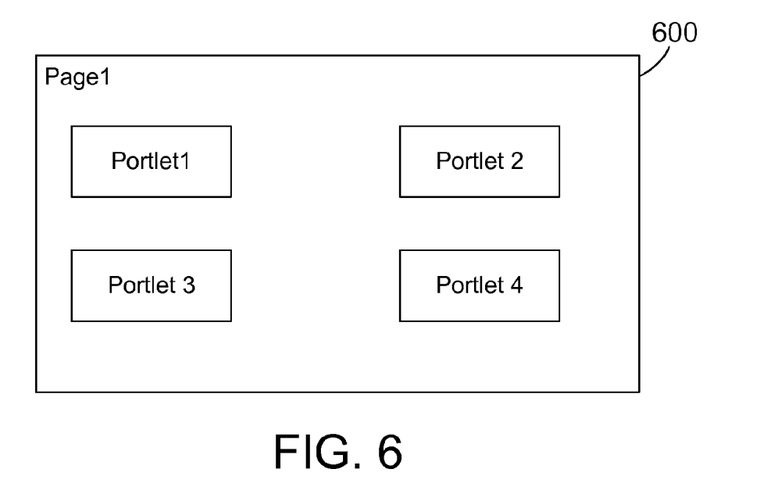
FIG. 6 is a block diagram of a sample page that includes four portlets.
Figure 7:
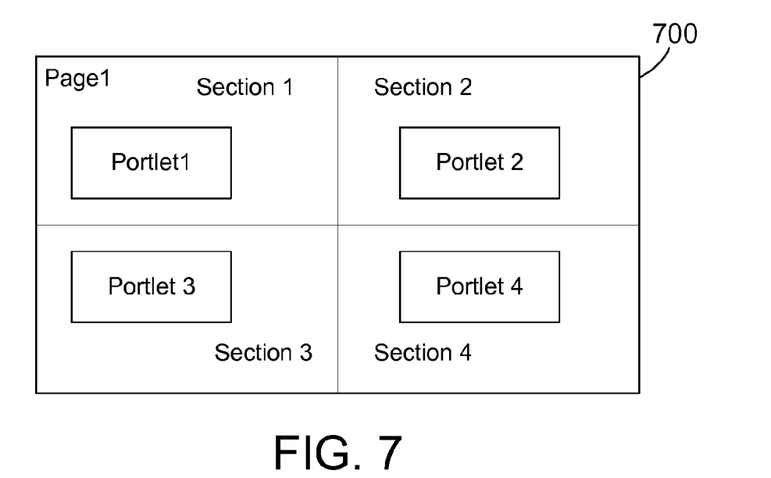
FIG. 7 shows the page in FIG. 6 after the page is divided to put each portlet in its own section.
Figure 8:
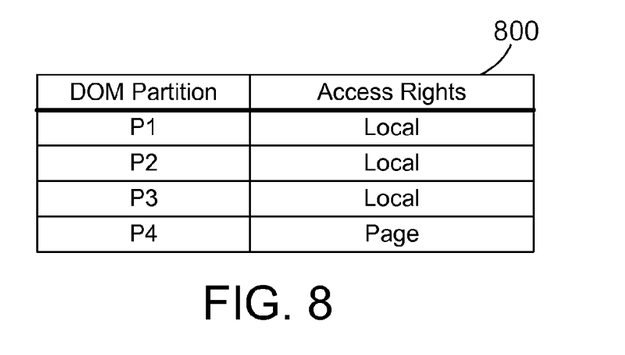
FIG. 8 shows access rights for four DOM partitions that correspond to the four sections in FIG. 7.

A simple example will now illustrate the concepts discussed above. Referring to FIG. 6, a sample page 600 has been defined by a user to include four portlets, Portlet1, Portlet2, Portlet3 and Portlet4. The server of the sample page 600 inserts dividers in the page to separate the four portlets into four corresponding sections, as shown in FIG. 7. Note the page 700 corresponds to the page stream with dividers 127, where the dividers define the four sections shown in FIG. 7. Access rights are also defined for each DOM partition, as shown in table 800 in FIG. 8. Table 800 shows DOM partitions P1, P2 and P3 have local access rights, and partition P4 has page access rights. Note partitions P1, P2, P3 and P4 are DOM partitions that correspond to sections 1, 2, 3 and 4 in FIG. 7, and the access rights for each DOM partition are determined by reading the metadata in the page that defines access rights for the four sections. With the access rights as defined in FIG. 8, any script call from DOM partitions P1, P2 or P3 that attempts to access a different partition will be blocked. Any script call from partitions P1, P2 or P3 that accesses only its own partition will be processed. However, a script call from partition P4 that accesses different sections in the page will be allowed, because its access rights are scoped to the page and are not restricted to local access only.

The disclosure and claims disclose a way to divide a page into sections using dividers, then partition a DOM for the page into partitions that correspond to the sections defined by the dividers. Access rights may be defined for each DOM partition. Script calls from each DOM partition are intercepted, and the access rights for the DOM partition determine whether or not to allow accesses to other DOM partitions. If a script call in a DOM partition attempts to access a different DOM partition but does not have access rights to do so, the script call will be blocked, i.e., not processed. If a script call in a DOM partition does not attempt to access a different DOM partition, the script call is processed. If a script call in a DOM partition attempts to access a different DOM partition and has access rights to do so, the script call will be processed. In this manner, script calls may be scoped to prevent unwanted scripts from being executed, thereby enhancing the security of the system and preventing hacker attacks.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, scoping of scripts could be done on a script-by-script basis, or could be done based on the partition. For example, scripts or partitions could be defined as public, allowing other partitions to access them through the API. When a DOM partition accesses a public script in a different DOM partition, or if the DOM partition is defined as public, the script could be processed. The disclosure and claims herein extend to any suitable scoping of scripts in a page.

The invention claimed is:

1. An apparatus comprising: at least one processor; a memory coupled to the at least one processor; a browser residing in the memory and executed by the at least one processor that provides an interface for a user to request a selected page, the browser receiving a page stream with dividers that corresponds to the selected page and partitioning a document object model corresponding to the selected page according to a plurality of sections defined by the dividers in the selected page to define a plurality of partitions in the document object model, the browser intercepting calls to scripts in the selected page and blocking a first call by a first script in a first partition in the document object model that attempts to access content in a second partition in the document object model; and an access rights mechanism that determines access rights for each partition in the document object model from metadata in the page stream that corresponds to each section in the selected page, wherein the browser blocks the first call when the access rights for the first partition do not allow calls that access content outside the first partition.

2. The apparatus of claim 1 wherein the browser, in response to receiving a second call to a second script in a second partition in the document object model that attempts to access content in a third partition in the document object model, reads access rights for the second partition and executes the second script when the access rights for the second partition allow the second script in the second partition to access the third partition.

3. The apparatus of claim 2 wherein the browser, in response to receiving the second call to the second script that attempts to access content in the third partition, reads access rights for the second partition and blocks execution of the second script when the access rights do not allow the second script in the second partition to access the third partition.

4. The apparatus of claim 1 wherein the browser intercepts the calls to the scripts in the selected page by defining at least one script object in the document object model and routing all script calls in the selected page to the at least one script object.

5. The apparatus of claim 1 wherein the browser processes a second call to the first script in the first partition in the document object model that only accesses content in the first partition.

6. A computer-implemented method for a browser to process a selected page received from a content provider, the method comprising the steps of: providing at least one processor; providing a memory coupled to the at least one processor; the at least one processor performing the steps of: receiving a page stream with dividers that corresponds to the selected page; partitioning a document object model corresponding to the selected page according to the dividers to define a plurality of partitions in the document object model; determining access rights for each partition in the document object model from metadata in the page stream that corresponds to each section in the selected page; intercepting calls to scripts in the selected page; and blocking a first call by a first script in a first partition in the document object model that attempts to access content in a second partition in the document object model when the access rights for the first partition do not allow calls that access content outside the first partition.

7. The method of claim 6 further comprising the steps of: assembling a page stream without dividers for the selected page; inserting a plurality of dividers into the page stream for the selected page to define a plurality of sections in the selected page; defining access rights for at least one of the plurality of sections in the selected page; and generating metadata in the page stream for the selected page for the at least one of the plurality of sections based on the access rights for the at least one of the plurality of sections.

8. The method of claim 6 wherein, in response to receiving a second call to a second script in a second partition in the document object model that attempts to access content in a third partition in the document object model, performing the steps of: reading access rights for the second partition; and executing the second script when the access rights for the second partition allow the second script in the second partition to access the third partition.

9. The method of claim 8 wherein, in response to receiving the second call to the second script that attempts to access content in the third partition, performing the step of: blocking execution of the second script when the access rights for the second partition do not allow the second script in the second partition to access the third partition.

10. The method of claim 6 further comprising the step of intercepting the calls to the scripts in the selected page by performing the steps of: defining at least one script object in the document object model; and routing all calls in the selected page to the at least one script object.

11. The method of claim 6 further comprising the step of processing a second call to the first script in the first partition in the document object model that only accesses content in the first partition.

* * * * *